United States Patent
Takahashi et al.

(10) Patent No.: US 7,143,735 B2
(45) Date of Patent: Dec. 5, 2006

(54) OIL-GUIDING CRANKCASE WELL STRUCTURE FOR PROMOTING BEARING LUBRICATION, AND ENGINE INCLUDING SAME

(75) Inventors: Akira Takahashi, Saitama (JP); Hidemi Yokoyama, Saitama (JP); Fuminori Mizutani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 10/941,748

(22) Filed: Sep. 15, 2004

(65) Prior Publication Data
US 2005/0061287 A1 Mar. 24, 2005

(30) Foreign Application Priority Data
Sep. 18, 2003 (JP) ............................. 2003-326554

(51) Int. Cl.
*F01M 1/00* (2006.01)
(52) U.S. Cl. .................. 123/195 H; 123/196 R
(58) Field of Classification Search ............ 123/196 R, 123/195 H, 195 R, 196 M, 196 W; 184/6.5, 184/11.1, 13.1
See application file for complete search history.

(56) References Cited
U.S. PATENT DOCUMENTS

| | | | |
|---|---|---|---|
| 4,766,858 A * | 8/1988 | Yoshidome et al. | 123/195 R |
| 4,873,945 A * | 10/1989 | Tamba et al. | 123/54.4 |
| 4,903,654 A * | 2/1990 | Sato et al. | 123/196 W |
| 5,887,678 A * | 3/1999 | Lavender | 184/11.2 |
| 6,497,211 B1 * | 12/2002 | Nomura et al. | 123/195 R |

FOREIGN PATENT DOCUMENTS
JP 58-112799 8/1983

* cited by examiner

Primary Examiner—Stephen K. Cronin
Assistant Examiner—Hyder Ali
(74) Attorney, Agent, or Firm—Carrier, Blackman & Associates, P.C.; William D. Blackman; Joseph P. Carrier

(57) ABSTRACT

A first aspect of an oil distributing structure for an internal combustion engine includes a bearing support wall including a plurality of guide ribs which are radially mounted on a surface thereof. The guide ribs may be integrally formed, and extend around an upper half of the bearing, for collecting oil which is splashed onto, and flows down the wall surface. In a second aspect of an oil distributing structure for an internal combustion engine, a slanted edge portion, descending toward the bearing, is formed on the bearing support wall, and is disposed laterally of a lower portion of the bearing. The described structure is useful for collecting oil splashed onto a wall surface of a crankcase, and for supplying the collected oil to a bearing in an internal combustion engine of the type in which a crankshaft bearing is supplied with oil splashed from nearby gears.

14 Claims, 5 Drawing Sheets

US 7,143,735 B2

OIL-GUIDING CRANKCASE WELL STRUCTURE FOR PROMOTING BEARING LUBRICATION, AND ENGINE INCLUDING SAME

CROSS-REFERENCE TO RELATED APPLICATIONS

The present application claims priority under 35 USC 119 based on Japanese patent application No. 2003-326554, filed Sep. 18, 2003.

BACKGROUND OF THE INVENTION

1. Field of the Invention

The present invention relates to internal combustion engines. More particularly, the present invention relates to oil-guiding internal crankcase wall structure for an internal combustion engine, for promoting lubrication of a crankshaft support bearing via splash oil feed.

2. Description of the Background Art

A number of designs have been developed for internal combustion engines, of the type in which crankshaft support bearings are supplied with oil splashed from nearby gears. In order to properly lubricate the crankshaft support bearings, these engines must effectively collect oil splashed on an inner wall surface of the crankcase, and supply the collected oil to the bearings.

In one of the known designs of this type, an oil splash receiving means is provided above the bearings, for collecting splashed oil, and for supplying the oil to the bearings through a communication hole defined in a lower portion of the oil splash receiving means (see, for example, Japanese Laid-Open Patent No. Sho 58-112799, FIGS. 2 and 3).

However, the structure of the design in this reference is complicated, because the separate oil splash receiving means needs to be separately manufactured, and mounted on the crankcase wall during engine assembly.

Although the known devices have some utility for their intended purposes, a need still exists in the art a method and apparatus for effectively collecting oil splashed onto the wall surface of a crankcase, and supplying the collected oil to a bearing in an internal combustion engine of the type in which a support bearing of a crankshaft is supplied with oil splashed from nearby gears.

SUMMARY OF THE INVENTION

The present invention has been provided in an effort to solve the above problem, and to simplify the manufacture of an engine in which a support bearing of a crankshaft is supplied with oil splashed from nearby gears.

According to a first aspect of the present invention, a first lubricating structure is provided for supplying oil to a bearing with splash oil feed. In the lubricating structure according to the first aspect hereof, a plurality of divergent guide ribs are integrally formed on an interior surface of a crankcase bearing support wall. These guide ribs are situated in an area around an upper half of the bearing, and are provided for collecting oil which is splashed onto, and flows down the wall surface.

According to a second aspect of the present invention, another lubricating structure is provided for a bearing with splash oil feed. In the lubricating structure according to the second aspect hereof, a slanted wall, descending toward the bearing, is integrally formed with a bearing support wall, and is disposed laterally of a lower portion of the bearing.

According to a third aspect of the present invention, still another lubricating structure is provided for a bearing with splash oil feed. In the lubricating structure according to the third aspect hereof, guide ribs are integrally formed on a wall surface of a bearing support wall around an upper half of the bearing, for collecting oil which is splashed onto, and flows down the wall surface, and in addition, a slanted wall, descending toward the bearing, is formed integrally with a bearing support wall, and is disposed laterally of a lower portion of the bearing.

According to the first aspect of the invention, oil which is splashed onto the wall surface of the crankcase can effectively be collected by a simple structure.

According to the second aspect of the invention, the oil flowing from above can effectively be supplied to the bearing by a simple structure.

According to the third aspect of the invention, the collection of the oil and the supply of the oil to the bearing can be combined for more effectively feeding the oil.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures considered necessary for clarifying the present invention are described herein. Other conventional structures, and those of ancillary and auxiliary components of the engine are assumed to be known and understood by those skilled in the art.

Figure 1:
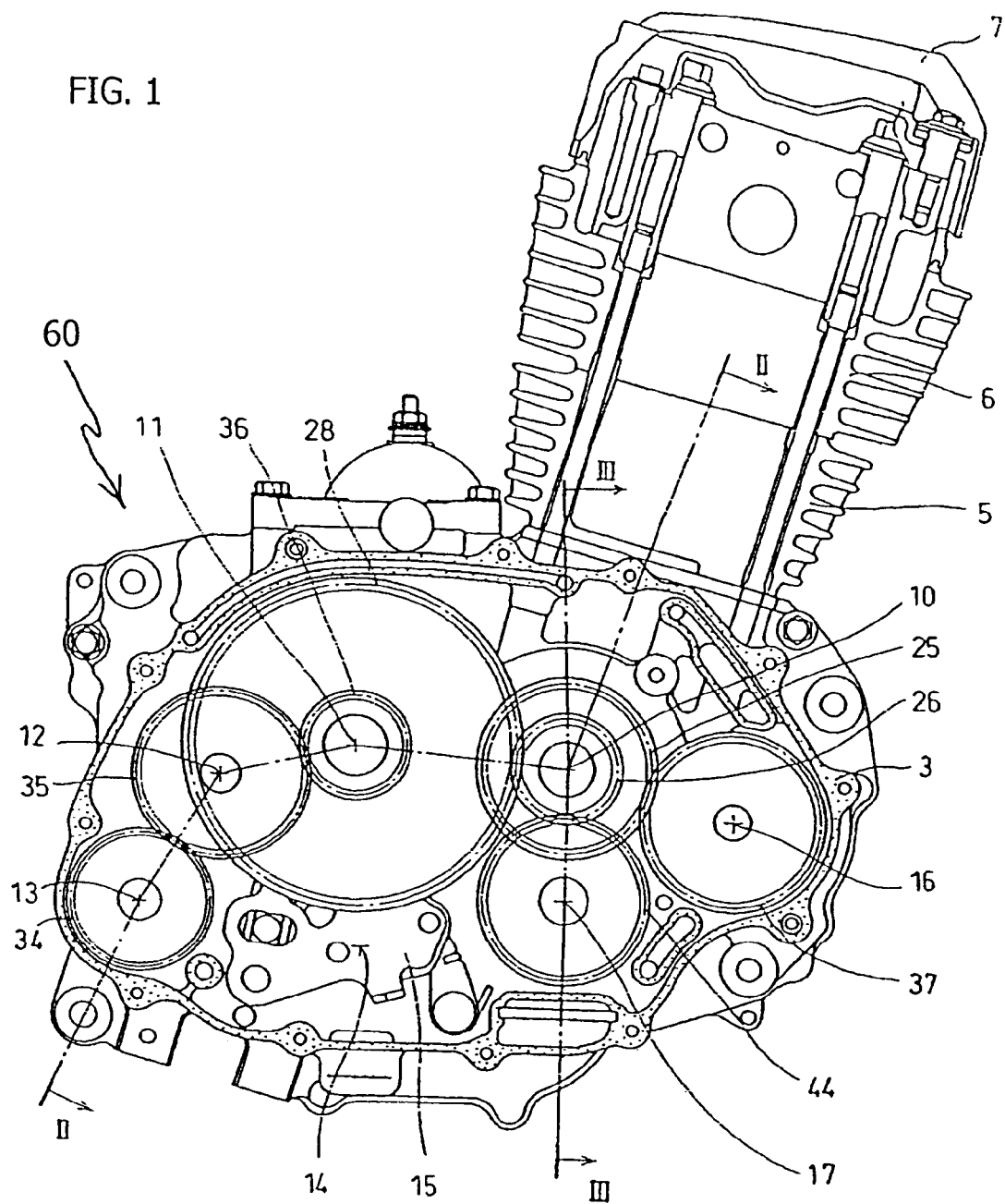
FIG. 1 is a vertical cross-sectional view, as viewed from the right side, of an air-cooled internal combustion engine for a motorcycle, incorporating an oil-guiding crankcase wall structure according to a selected illustrative embodiment of the present invention.
Figure 2:
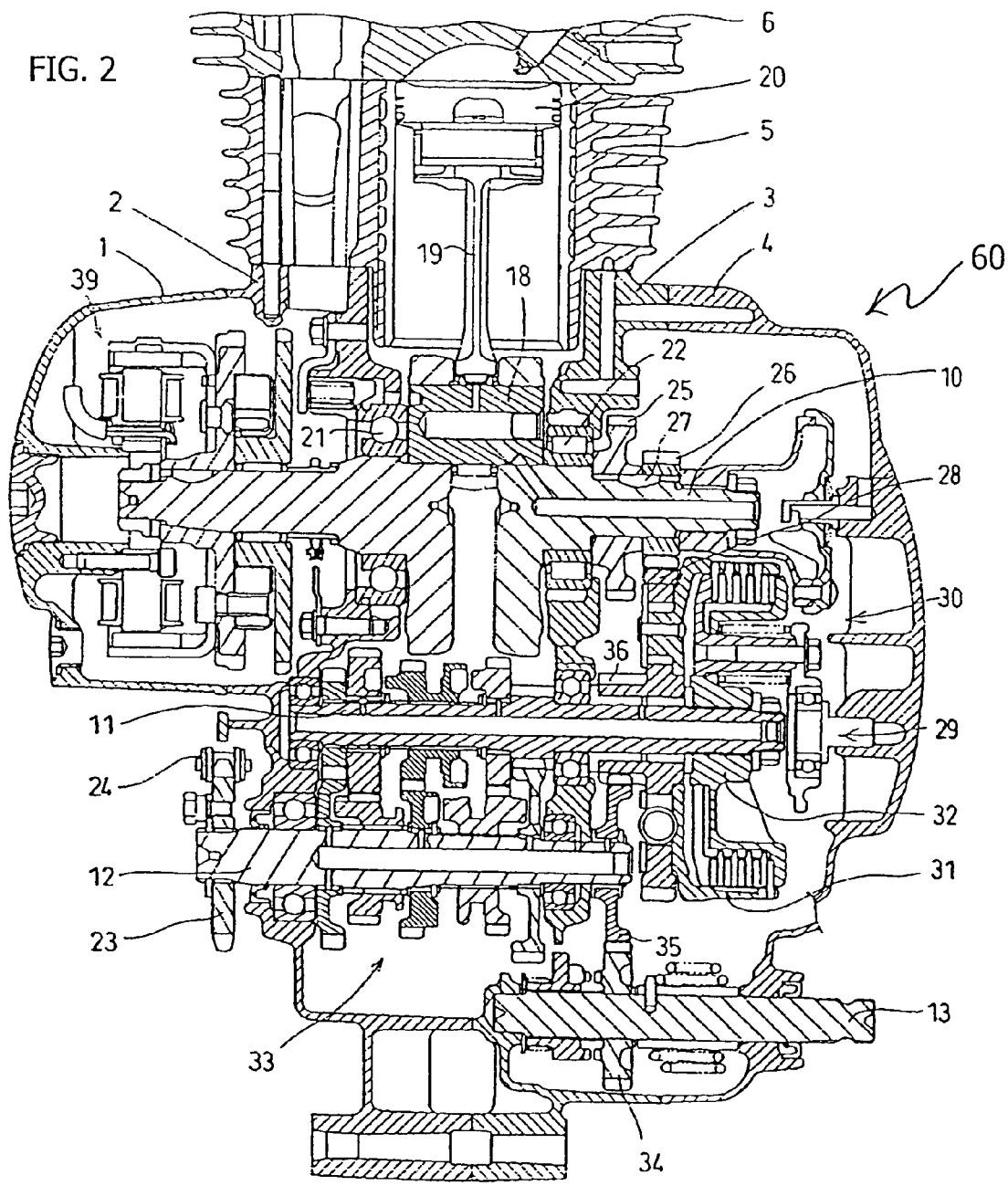
FIG. 2 is a cross-sectional view of the engine of FIG. 1, taken alone line II—II of FIG. 1.

FIG. 1 is a vertical cross-sectional view, as viewed from the right side, of an air-cooled internal combustion engine for a motorcycle, incorporating an oil-guiding crankcase wall structure according to a selected illustrative embodiment of the present invention. FIG. 1 shows the position of a rotational shaft projecting to the right of a right crankcase and the positions of some gears, with a right case cover of a transmission being omitted from the drawing for illustrative purposes. FIG. 2 is a cross-sectional view of the engine of FIG. 1, taken along line II—II of FIG. 1.

As shown in FIGS. 1 and 2, a crankcase assembly 60 includes a left case cover 1, a left crankcase 2, a right crankcase 3, and a right case cover 4. A cylinder block 5, a cylinder head 6, and a cylinder head cover 7 are connected to an upper portion of the crankcase assembly 60.

A crankshaft 10 is rotatably mounted in the crankcase assembly 60, and is operatively connected to a main transmission shaft 11 via a clutch 30, to be described later. The engine also includes a transmission countershaft 12, and a starter shaft 13.

In the drawings, reference numeral 14 designates a central axis about which a shift drum is rotatable, 15 designates a foot-operated gearshift lever, and reference numeral 16 designates a balance shaft. Further in the drawings, reference numeral 17 designates an oil pump shaft, 18 designates a crankpin, 19 designates a connecting rod connected to the crankpin 18, and 20 designates a piston connected to the connecting rod 19. The piston 20 is vertically reciprocally movable in the cylinder block 5.

As shown in FIG. 2, the crankshaft 10 is rotatably supported in the left crankcase 2 by a ball bearing 21, is supported in the right crankcase 3 by a roller bearing 22. The main transmission shaft 11 and the transmission countershaft 12 are also supported on the left crankcase 2 and the right crankcase 3 by ball bearings. The kick starter shaft 13 is supported by the right crankcase 3 and the right case cover 4.

The countershaft 12 serves as the output shaft of the internal combustion engine, and has an outer end portion projecting out of the left crankcase 2 and supporting a drive sprocket 23, which drives the rear wheel of the motorcycle through a chain 24. An alternator 39 is coupled to the left end of the crankshaft 10.

A balancer drive gear 25 and a common drive gear 26 are fixed to a right portion of the crankshaft 10 by a key 27. The balancer drive gear 25 is enmeshed with a balancer driven gear 37 (FIG. 1). The common drive gear 26 is enmeshed with a main shaft driven gear 28 on the main transmission shaft 11, and also with an oil pump driven gear 44 on the oil pump shaft 17 (FIG. 1).

As shown in FIG. 2, the main shaft driven gear 28, which is constantly enmeshed with the common drive gear 26, is fitted over a right portion of the main transmission shaft 11, the main shaft driven gear 28 being selectively rotatable relatively to the main transmission shaft 11.

A multi-plate clutch 30, which is normally engaged, but disengageable when an actuating mechanism 29 is operated, is mounted on the right end of the main transmission shaft 11. The multi-plate clutch 30 has a clutch outer member 31 fixed to the main shaft driven gear 28, and a clutch inner member 32 fixed to the main transmission shaft 11. Rotary movement of the crankshaft 10 is transmitted through the common drive gear 26 to the main shaft driven gear 28 and then, through the multi-plate clutch 30, to the main transmission shaft 11.

As shown in FIG. 2, a transmission gear train 33 is mounted on the main transmission shaft 11 and the countershaft 12. The transmission gear train 33 includes five gears mounted on the main transmission shaft 11, and five gears mounted on the countershaft 12. The gears on the countershaft 12 are enmeshed with the five gears on the main transmission shaft 11 at nearly all times. These ten gears are classified into three types of different types as follows: (a) gears fixed to a shaft, (b) gears held on a shaft by a slide bearing, and circumferentially rotatable relatively to the shaft but axially immovable, and (c) gears held on a shaft by a spline, and axially movable, but rotationally fixed relative to the shaft.

The axially movable gears (c) provide a dog clutch and are axially moved by a shift fork (not shown) engaging the dog clutch at all times, into engagement with the relatively rotatable gears (b) which are positioned adjacent thereto, thus securing the gears (b) to the shaft. Such a set of gears for transmitting power is selectively created by the above operation for providing gear positions ranging from first to fifth gear positions.

A gear 34 on the kick starter shaft is capable of starting to rotate the crankshaft 10 through a gear 35 on the right end of the countershaft, a gear 36 on the right end of the main transmission shaft, the main shaft driven gear 28 on the main transmission shaft 11, and the common drive gear 26 on the crankshaft.

Figure 3:
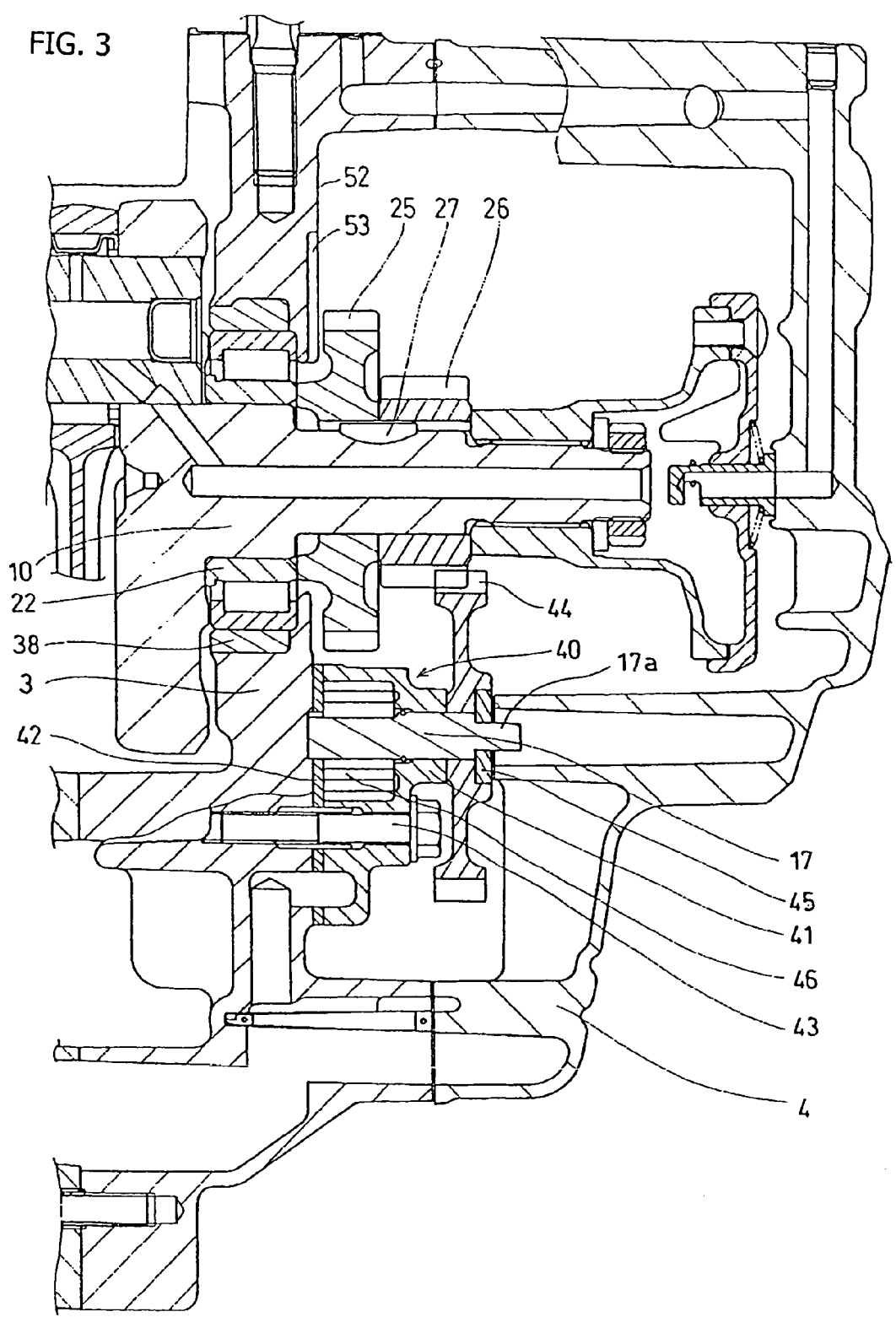
FIG. 3 is a cross-sectional detail view of the engine of FIG. 1, taken along line III—III of FIG. 1 and showing right half components in a crankcase.

FIG. 3 is a cross-sectional detail view taken along line III—III of FIG. 1, showing components in the right side of the crankcase. The crankshaft 10 has a right end portion supported on the right crankcase 3 by the roller bearing 22, with a bushing 38 interposed between the right crankcase 3 and the roller bearing 22. As described above, the balancer drive gear 25 and the common drive gear 26 are mounted on the crankshaft 10 by the common key 27.

An oil pump 40 is disposed below the crankshaft 10. The oil pump 40 has a pump case 41 fastened to the right crankcase 3 by a steel plate 42 and a bolt 43. The oil pump shaft 17 is rotatably supported by the right crankcase 3 and a wall of the pump case 41. The oil pump driven gear 44 is fixed to the oil pump shaft 17 by a tenon 17a formed at the end of the oil pump shaft and a set plate 45. The oil pump driven gear 44 is enmeshed with the common drive gear 26. An oil pump rotor 46 is fitted over the oil pump shaft 17. When the crankshaft 10 is rotated, the oil pump rotor 46 is rotated by the common drive gear 26, the oil pump driven gear 44, the set plate 45, the tenon 17a, and the oil pump shaft 17.

Figure 4:
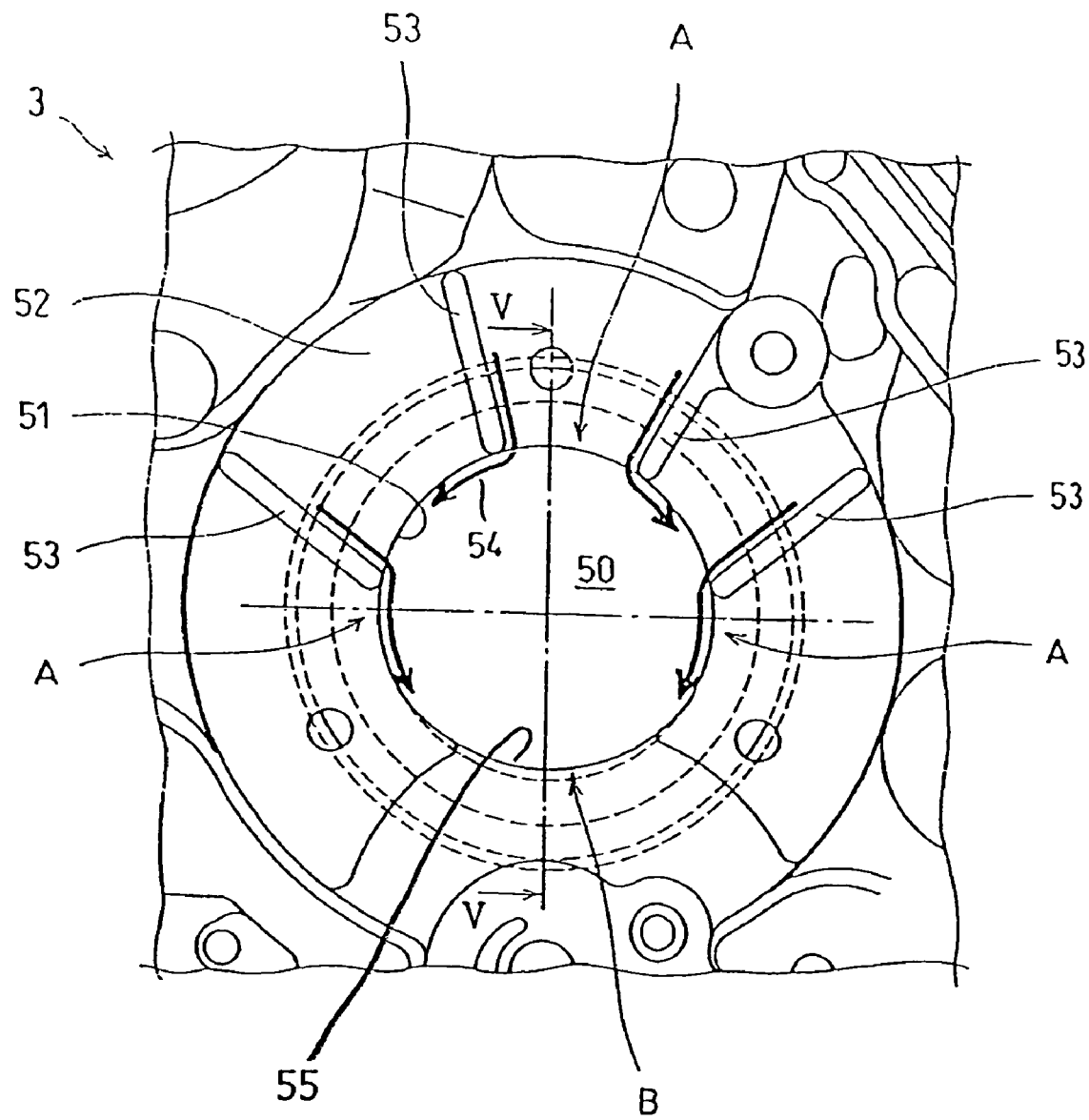
FIG. 4 is a view showing a region of a right crankcase wall as it is viewed from a vantage point inside the crankcase, according to the above embodiment.

FIG. 4 is a detail view showing a region of the right crankcase 3 as it is viewed from the right. The right crankcase 3 has a central through hole 50 formed therein, and an end portion of the crankshaft 10 extends through this central through hole 50. The solid line around the central through hole 50 represents a peripheral inner edge 51 of the right crankcase 3 surrounding the central through hole 50. Although not shown in the illustration of FIG. 4, the roller bearing 22 is mounted in the right crankcase 3 on the other side of the peripheral edge 51.

An inwardly-facing wall surface 52 of the right crankcase 3, in an area around an upper half of the bearing 22, has four guide ribs 53 thereon, extending substantially radially outwardly from the central through hole 50, for channeling and directing the flow of oil therepast. The guide ribs 53 are formed as an integral part of the right crankcase 3 when it is cast. The guide ribs are located above a horizontal dividing line 57 extending across the central through hole 50, and each rib extends upwardly at an angle on the wall surface 52, to direct oil towards the hole 50. The guide ribs 53 serve to collect oil splashed onto and flowing down the crankcase wall surface, and to guide the collected oil to the peripheral edge 51 of the central through hole 50.

Figure 5A:
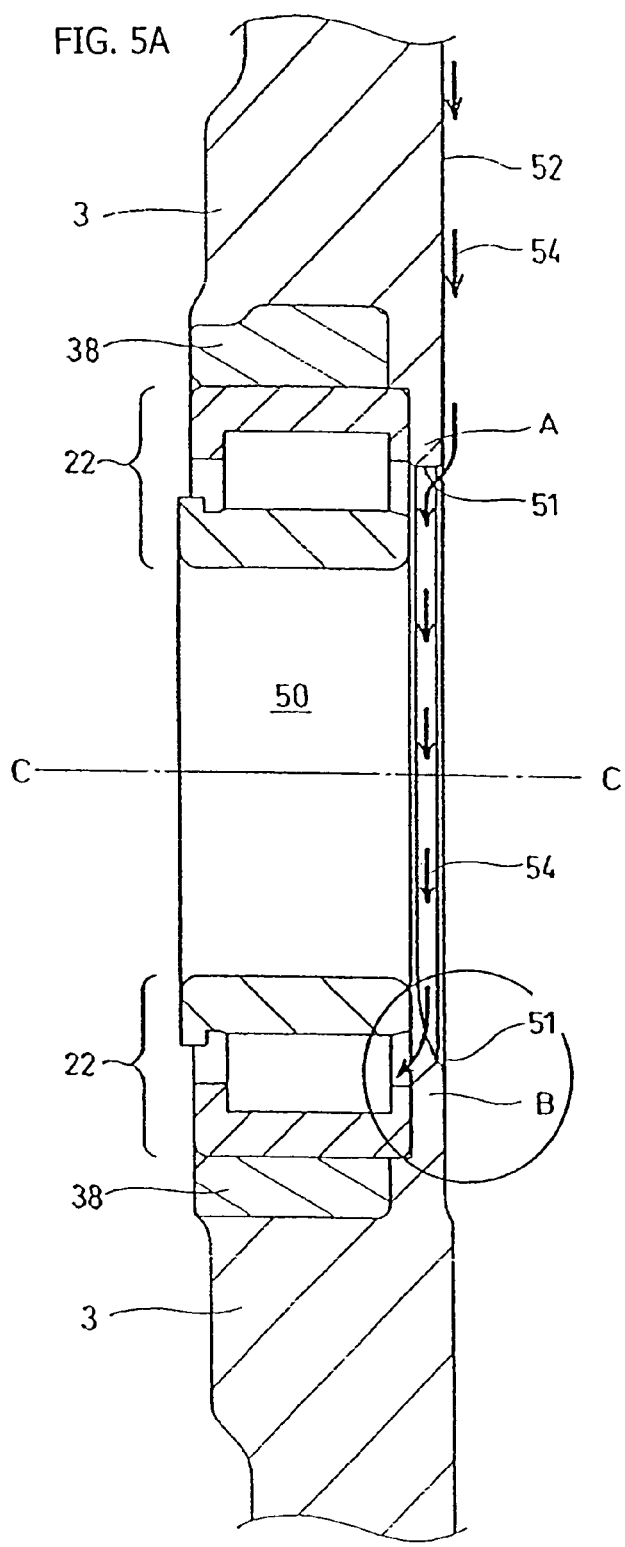
FIG. 5A is a cross-sectional detail view of the crankcase wall of FIG. 4, taken along line V—V of FIG. 4, and showing a cross section of a crankshaft supporting section.
Figure 5B:
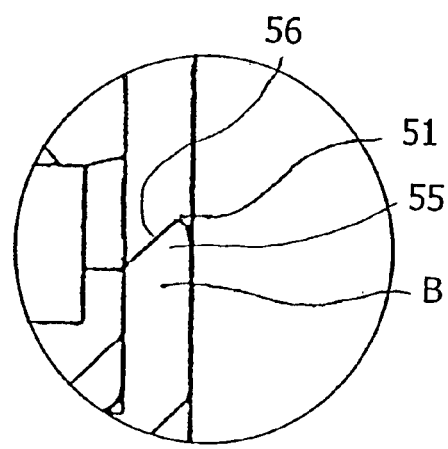
FIG. 5B is an enlarged detail view of a portion of the crankcase wall of FIG. 5A.

FIG. 5A is a cross-sectional view taken along line V—V of FIG. 4, showing at an enlarged scale a cross section of the crankshaft supporting section shown in FIG. 3. FIG. 5B is a detail view of the circled section of FIG. 5A.

FIG. 5A shows a region of the right crankcase 3, the roller bearing 22, and the bushing 38. The crankshaft 10 is omitted from the drawing in FIGS. 5A–5B for purposes of illustration. The dot-and-dash line C—C represents the center line of the crankshaft.

In the right crankcase 3, the peripheral edge 51 around the central through hole is positioned laterally of the roller bearing 22.

The cross-sectional shape of the peripheral edge 51, surrounding the central through hole, is different in its upper and lower sides. Specifically, the tip portion of the peripheral edge 51 has a normal-type cross-sectional shape A. The normal-type cross-sectional shape A has an inner peripheral surface parallel to the crankshaft axis, and is beveled normally.

In contrast, the bottom portion of the peripheral edge 51 has an oil-collecting-type cross-sectional shape B, with a raised lower lip 55 formed thereon. The raised lower lip 55 is formed with an upper surface 56 which is inclined inwardly and downwardly towards the bearing 22, as shown in FIG. 5B, and the ramped upper surface 56 defines a slanted surface descending toward the roller bearing.

As shown in FIG. 4, the normal-type cross-sectional shape A is applied to the peripheral edge 51 on the upper side and the left and right sides of the central through hole 50. The oil-collecting-type cross-sectional shape B is applied to the peripheral edge 51 on the lower side of the central through hole only. The peripheral edge 51 of the oil-collecting-type cross-sectional shape B is capable of guiding oil toward the roller bearing 22.

In order to achieve adequate lubrication, internal combustion engines, of the type in which the crankshaft bearing is supplied with oil splashed from nearby gears, need to effectively collect oil splashed onto the wall surface of the crankcase, and supply an adequate lubricating amount of the collected oil to the bearing. In the engine depicted in the drawings, oil is splashed on the crankcase wall 52 from, e.g., the balancer drive gear 25, the balancer driven gear 37, the common drive gear 26, the main shaft driven gear 28, and the oil pump driven gear 44, among other engine components.

According to the present embodiment, a significant amount of the oil splashed onto and flowing down the crankcase wall surface 52, around the upper half of the roller bearing 22, is collected by the guide ribs 53 (FIG. 4), and is directed down the guide ribs toward the peripheral edge 51. The oil is then allowed to flow along the peripheral edge 51, and then received by the bottom portion of the peripheral edge 51, having the oil-collecting-type cross-sectional shape B thereon. The oil is then guided to the roller bearing 22 along the slanted surface 56 of the raised lower lip 55, and supplied to the roller bearing 22.

Since the rollers of the roller bearing 22 move along the peripheral edge 51 of the central through hole 50, the supplied oil is distributed to all the rollers of the roller bearing 22. The smaller arrows 54 shown in FIGS. 4 and 5 represent the flow of the oil as it flows downwardly.

In the above embodiment, the present invention has been described with respect to the bearing on the right crankcase. However, the present invention is also applicable to the bearing on the left crankcase. In the above embodiment, oil on the outer wall surface of the crankcase is collected and supplied to the bearing. However, it is possible, with the same means as described above, to collect oil on the inner wall surface of the crankcase and supply the collected oil to the bearing. While the peripheral edge 51 has both the guide ribs 53 and the oil-collecting-type cross-sectional shape B in the above embodiment, the peripheral edge 51 may have either the guide ribs 53 or the oil-collecting-type cross-sectional shape B.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

We claim:

1. In an internal combustion engine comprising a crankcase, a crankshaft support bearing mounted in the crankcase, and a crankshaft which rotates in the bearing, said engine adapted to lubricate said bearing via splashing oil in said crankcase, the improvement comprising:
an oil-directing wall structure comprising
a plurality of ribs formed on a wall surface of a bearing support wall of said crankcase, for collecting oil which is splashed onto and flows down the wall surface, said ribs disposed substantially radially relative to said bearing and situated proximate an upper half of the bearing,
a central through hole formed in said bearing support wall for receiving a crankshaft support bearing therein, and wherein said ribs are oriented to direct oil flowing down said wall surface toward said central through hole, and
a raised lower lip formed on the support wall at an edge of said central through hole below said guide ribs, said raised lower lip having a slanted upper surface which is inclined inwardly and downwardly towards the bearing.

2. The oil-directing wall structure of claim 1, wherein each of the guide ribs defines a substantially oblique angle.

3. The oil-directing wall structure of claim 1, wherein the guide ribs are integrally formed as a part of said bearing support wall.

4. The oil-directing wall structure of claim 1, wherein said crankshaft support bearing is a roller bearing.

5. An oil-directing crankcase wall structure for a crankcase wall supporting a crankshaft support bearing, said wall structure adapted to direct oil flow towards said bearing with splash oil feed, wherein
a slanted wall, descending toward the bearing, is formed on a part of said bearing support wall, the slanted wall disposed laterally of a lower portion of the bearing, and
wherein a central through hole is formed in said bearing support wall for receiving said crankshaft support bearing therein, and the bearing support wall comprises protruding ribs, and said ribs are oriented to direct oil flowing down said wall surface toward said central through hole.

6. The oil-directing wall structure of claim 5, wherein the support wall has a raised lower lip formed therein at an edge of said central through hole.

7. The oil-directing wall structure of claim 6, wherein the raised lower lip is formed with an upper surface which is inclined inwardly and downwardly towards the bearing.

8. The oil-directing wall structure of claim 6, wherein the raised lower lip is disposed laterally of a lower portion of the bearing.

9. In an internal combustion engine of the type having a crankcase and a crankshaft support bearing operatively attached to said crankcase, the improvement comprising:
an oil-directing crankcase wall structure for facilitating lubrication of said crankshaft support bearing with splash oil feed, said wall structure comprising:
a plurality of guide ribs which are substantially radially mounted on a wall surface of a bearing support wall around an upper half of the bearing, for collecting oil which is splashed onto, and flows down the wall surface, and a slanted wall, descending toward the bearing, is formed on said bearing support wall disposed laterally of a lower portion of the bearing.

10. An engine comprising a crankcase, a crankshaft rotatably supported in said crankcase, a crankshaft support bearing operatively attached to said crankcase, a cylinder block attached to said crankcase, and a piston operatively attached to said crankshaft for reciprocal movement in said cylinder block, wherein said crankcase comprises a bearing support wall for supportively holding a crankshaft support bearing;

wherein a plurality of oil guide ribs are integrally formed on a wall surface of said bearing support wall, said guide ribs being situated proximate an upper half of the bearing, for guiding movement of oil which is splashed onto, and flows down the wall surface, and wherein the support wall has a raised lower lip formed therein at an edge of said central through hole below said guide ribs, and wherein the raised lower lip is formed with an upper surface which is inclined inwardly and downwardly towards the bearing.

11. The engine of claim 10, wherein each of the guide ribs defines a substantially oblique angle.

12. The engine of claim 10, wherein the guide ribs extend substantially radially relative to said crankshaft support bearing as a part of said bearing support wall.

13. The engine of claim 10, wherein a central through hole is formed in said bearing support wall for receiving a crankshaft support bearing therein, and wherein said ribs are oriented to direct oil flowing down said wall surface toward said central through hole.

14. The engine of claim 10, wherein said crankshaft support bearing is a roller bearing.

* * * * *